United States Patent
Ikeda et al.

(10) Patent No.: US 10,744,592 B2
(45) Date of Patent: Aug. 18, 2020

(54) FRICTION STIR WELDING TOOL MEMBER MADE OF SILICON NITRIDE SINTERED BODY AND FRICTION STIR WELDING APPARATUS USING SAME

(71) Applicants: KABUSHIKI KAISHA TOSHIBA, Tokyo (JP); TOSHIBA MATERIALS CO., LTD., Yokohama-Shi, Kanagawa-Ken (JP)

(72) Inventors: Isao Ikeda, Kanagawa (JP); Kai Funaki, Kanagawa (JP); Yutaka Abe, Kanagawa (JP)

(73) Assignees: KABUSHIKI KAISHA TOSHIBA, Tokyo (JP); TOSHIBA MATERIALS CO., LTD., Yokohama-Shi (JP)

( * ) Notice: Subject to any disclaimer, the term of this patent is extended or adjusted under 35 U.S.C. 154(b) by 0 days.

(21) Appl. No.: 15/509,592

(22) PCT Filed: Aug. 28, 2015

(86) PCT No.: PCT/JP2015/074455
§ 371 (c)(1),
(2) Date: Mar. 8, 2017

(87) PCT Pub. No.: WO2016/047376
PCT Pub. Date: Mar. 31, 2016

(65) Prior Publication Data
US 2017/0297141 A1    Oct. 19, 2017

(30) Foreign Application Priority Data
Sep. 25, 2014   (JP) ................................. 2014-195605

(51) Int. Cl.
*B23K 20/12* (2006.01)
*C04B 35/593* (2006.01)
(Continued)

(52) U.S. Cl.
CPC .......... *B23K 20/1255* (2013.01); *B23K 20/12* (2013.01); *B23K 20/122* (2013.01);
(Continued)

(58) Field of Classification Search
CPC .. B23K 20/1255; B23K 20/125; B23K 20/12; B23K 20/122
See application file for complete search history.

(56) References Cited

U.S. PATENT DOCUMENTS

| 2004/0191535 A1 | 9/2004 | Komatsu |
| 2006/0169740 A1* | 8/2006 | Fukuhara ............. B23K 20/125 228/2.1 |

(Continued)

FOREIGN PATENT DOCUMENTS

| JP | 08-012441 A | 1/1996 |
| JP | 2010-194591 A | 9/2010 |

(Continued)

OTHER PUBLICATIONS

Engineers Edge; https://www.engineersedge.com/manufacturing/surface-roughness-conversion.htm; Jul. 2, 2014 (Year: 2014).*

*Primary Examiner* — Erin B Saad
(74) *Attorney, Agent, or Firm* — Foley & Lardner LLP

(57) ABSTRACT

The present invention provides a welding tool member for friction stir welding comprising a silicon nitride sintered body, wherein the silicon nitride sintered body includes an additive component other than silicon nitride in a content of 15% by mass or less, and the additive component includes three or more elements selected from Y, Al, Mg, Si, Ti, Hf, Mo and C. It is preferable that the content of the additive component is 3% by mass or more and 12.5% by mass or less. It is also preferable that the additive component includes four or more elements selected from Y, Al, Mg, Si, Ti, Hf, Mo and C. Due to above structure, there can be
(Continued)

provided a welding tool member for friction stir welding having a high durability.

10 Claims, 2 Drawing Sheets

(51) Int. Cl.
| | |
|---|---|
| *B28B 3/00* | (2006.01) |
| *C04B 35/587* | (2006.01) |
| *C04B 35/626* | (2006.01) |
| *C04B 35/63* | (2006.01) |
| *C04B 35/645* | (2006.01) |

(52) U.S. Cl.
CPC ............ B28B 3/003 (2013.01); C04B 35/587 (2013.01); C04B 35/593 (2013.01); C04B 35/6261 (2013.01); C04B 35/6303 (2013.01); C04B 35/6455 (2013.01); *C04B 2235/3206* (2013.01); *C04B 2235/3217* (2013.01); *C04B 2235/3222* (2013.01); *C04B 2235/3225* (2013.01); *C04B 2235/3232* (2013.01); *C04B 2235/3244* (2013.01); *C04B 2235/3418* (2013.01); *C04B 2235/386* (2013.01); *C04B 2235/3826* (2013.01); *C04B 2235/3839* (2013.01); *C04B 2235/3856* (2013.01); *C04B 2235/3865* (2013.01); *C04B 2235/3873* (2013.01); *C04B 2235/3878* (2013.01); *C04B 2235/3886* (2013.01); *C04B 2235/5436* (2013.01); *C04B 2235/6021* (2013.01); *C04B 2235/658* (2013.01); *C04B 2235/6567* (2013.01); *C04B 2235/6584* (2013.01); *C04B 2235/661* (2013.01); *C04B 2235/963* (2013.01)

(56) References Cited

U.S. PATENT DOCUMENTS

| | | |
|---|---|---|
| 2007/0161493 A1 | 7/2007 | Komatsu et al. |
| 2010/0054652 A1 | 3/2010 | Takao et al. |
| 2011/0039068 A1 | 2/2011 | Takao |
| 2011/0104515 A1* | 5/2011 | Kou .................. B23K 20/1265 |
| | | 428/649 |
| 2012/0321851 A1 | 12/2012 | Takao |
| 2014/0131426 A1 | 5/2014 | Walpole et al. |
| 2014/0224859 A1* | 8/2014 | Utsumi ................ C23C 30/005 |
| | | 228/2.1 |

FOREIGN PATENT DOCUMENTS

| | | |
|---|---|---|
| JP | 2011-098842 A | 5/2011 |
| JP | 2011-144109 A | 7/2011 |
| JP | 2013-071164 A | 4/2013 |

* cited by examiner

FRICTION STIR WELDING TOOL MEMBER MADE OF SILICON NITRIDE SINTERED BODY AND FRICTION STIR WELDING APPARATUS USING SAME

TECHNICAL FIELD

The below-described embodiments relate to a friction stir welding tool member made of a silicon nitride sintered body and a friction stir welding apparatus using the same.

BACKGROUND ART

The friction stir welding (FSW) is a welding method for integrating a plurality of members by pressing a welding tool member called a probe against the plurality of members while the welding tool member is being rotated at a high-speed rotation and by taking advantage of frictional heat. In the friction stir welding method, a member (a base member) is softened with the frictional heat, the periphery of the welding portion is made to undergo plastic flow by the torque of the probe, and thus, it is possible to integrate a plurality of members (the base member and a mating member). Accordingly, the friction stir welding can be said to be a type of solid-phase welding.

The friction stir welding is a solid-phase welding, accordingly provides a small heat input into the welding portion, consequently toughens the formation of a heat-affected zone and results in a small extent of softening or distortion of a welding object. The friction stir welding does not use any welding brazing filler metal, and is expected to lead to cost reduction.

The welding tool member used in the friction stir welding is required to have both of the abrasion resistance (wear resistance) capable of withstanding the high-speed rotation and the heat resistance capable of withstanding the frictional heat.

As a conventional welding tool member, Japanese Patent Laid-Open No. 2011-98842 (Patent Document 1) discloses a welding tool member using a silicon nitride sintered body. The silicon nitride sintered body of Patent Document 1 includes cBN (cubic boron nitride), SiC (silicon carbide) and TiN (titanium nitride) in a content as large as 20 vol. %.

The welding tool member formed of a silicon nitride sintered body of Patent Document 1 undergoes a certain improvement of the abrasion resistance, but is still demanded to be further improved in abrasion resistance.

PRIOR ART DOCUMENTS

Patent Document

Patent Document 1: Japanese Patent Laid-Open No. 2011-98842

SUMMARY OF THE INVENTION

Problems to be Solved by the Invention

The present inventors investigated the cause for no improvement of the abrasion resistance in the above-described conventional welding tool member, and consequently have revealed that the amounts of the component elements other than silicon nitride are excessively large. It has been revealed that as in Patent Document 1, in the welding tool member in which cBN (cubic boron nitride), SiC (silicon carbide) and TiN (titanium nitride) are added in a content as large as 20 vol %, the sintering resistance is remarkable, and hence no dense sintered body can be obtained, and the abrasion resistance of the silicon nitride sintered body is insufficient.

Means for Solving the Problems

The problems to be solved by the invention are to provide a welding tool member for friction stir welding, made of silicon nitride sintered body including additive components other than silicon nitride in contents of 15% by mass or less. Such a welding tool member is improved in strength and heat resistance, and hence improved in abrasion resistance. Accordingly, a friction stir welding apparatus using the welding tool member according to an embodiment is allowed to obtain excellent properties.

DESCRIPTION OF EMBODIMENTS

Figure 1:
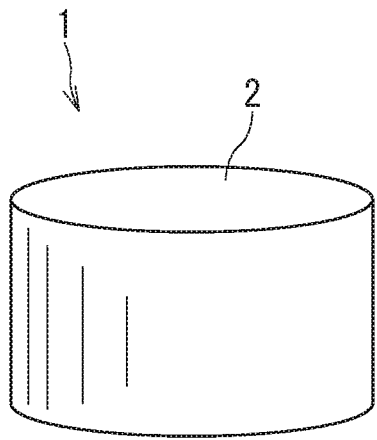
FIG. 1 is an oblique perspective view illustrating, as an example, a cylindrical welding tool member for friction stir welding.

The welding tool member for friction stir welding, made of a silicon nitride sintered body according to an embodiment is a welding tool member for friction stir welding including a silicon nitride sintered body, wherein an additive component other than silicon nitride is included in a content of 15% by mass or less, and the additive component includes three or more elements selected from Y, Al, Mg, Si, Ti, Hf, Mo and C.

In other words, the silicon nitride sintered body includes the additive component in a content of 15% by mass or less. The additive component means a component other than silicon nitride. In the silicon nitride sintered body, the additive component other than silicon nitride means a sintering aid component. The sintering aid component constitutes a grain boundary phase.

When the additive component exceeds 15% by mass to be excessively large in content, the grain boundary phase is excessively large in quantity. The silicon nitride sintered body has a structure in which long and thin β-silicon nitride crystal grains are intricately intertwined (complicatedly tangled). When the sintering aid component is increased in content, undesirably, there occur portions not allowed to have a structure in which the silicon nitride crystal grains are intricately intertwined, thus being not preferable.

The content of the additive component is preferably 3% by mass or more and 12.5% by mass or less. The content of the additive component further preferably 5% by mass or more and 12.5% by mass or less. When the content of the additive component is less than 3% by mass, the grain boundary phase is too small in quantity, and the density of the silicon nitride sintered body is liable to be decreased. When the content of the additive component is specified to be 3% by mass or more, the relative density of the sintered body is easily set to be 95% or more. When the content of the additive component is specified to be 5% by mass or more, the relative density of the sintered body is easily set to be 98% or more.

The additive component preferably includes three or more elements selected from Y, Al, Mg, Si, Ti, Hf, Mo and C. The presence form of the additive component is not limited, as long as the additive component includes as the constituent elements thereof Y (yttrium), Al (aluminum), Mg (magnesium), Si (silicon), Ti (titanium), Hf (hafnium), Mo (molybdenum) and C (carbon). Examples of the form include oxides (inclusive of composite oxides), nitrides (inclusive of composite nitrides), oxynitrides (inclusive of composite oxynitrides) and carbides (inclusive of composite carbides).

As described below, when the additive component is added as the sintering aid in the production process, oxides (inclusive of composite oxides), nitrides (inclusive of composite nitrides) and carbides (inclusive of composite carbides) are preferably used. In the case of the element Y, yttrium oxide ($Y_2O_3$) is preferable. In the case of the element Al, aluminum oxide ($Al_2O_3$), aluminum nitride (AlN) and $MgO.Al_2O_3$ spinel are preferable. In the case of the element Mg, magnesium oxide (MgO) and $MgO.Al_2O_3$ spinel are preferable. In the case of the element Si, silicon oxide ($SiO_2$) and silicon carbide (SiC) are preferable.

In the case of the element Ti, titanium oxide ($TiO_2$) and titanium nitride (TiN) are preferable. In the case of the element Hf, hafnium oxide ($HfO_2$) is preferable. In the case of the element Mo, molybdenum oxide ($MoO_2$) and molybdenum carbide ($Mo_2C$) are preferable. With regard to the element C, it is preferable to add as silicon carbide (SiC), titanium carbide (TiC) and titanium carbonitride (TiCN). By adding two or more of these additive components in combination, it is possible to constitute a grain boundary phase including three or more elements selected from Y, Al, Mg, Si, Ti, Hf, Mo and C. The additive component preferably includes four or more elements selected form Y, Al, Mg, Si, Ti, Hf, Mo and C.

The inclusion of three or more elements, further four or more elements selected from Y, Al, Mg, Si, Ti, Hf, Mo and C, as the sintering aid components improves the sinterability, prevents the coarsening of the silicon nitride crystal grains, and enables the formation of the high-strength crystal structure in which the R-silicon nitride crystal grains are intricately intertwined.

As the combination of the sintering aids to be added in the production process, the following combinations are preferable.

As a first combination, MgO, $Al_2O_3$, SiC and $SiO_2$ are added in contents of 0.1 to 1.7% by mass, 0.1 to 4.3% by mass, 0.1 to 10% by mass and 0.1 to 2% by mass, respectively. Herewith, four elements, Mg, Al, Si and C are included as the additive components. When MgO and $Al_2O_3$ are added, MgO and $Al_2O_3$ may be added as $MgO.Al_2O_3$ spinel in a content of 0.2 to 6% by mass.

To above the first combination, $TiO_2$ may be additionally added in a content of 0.1 to 2% by mass. The addition of $TiO_2$ to the first combination results in the inclusion of five elements, Mg, Al, Si, C and Ti as the additive components.

As a second combination, $Y_2O_3$, $MgO.Al_2O_3$ spinel, AlN, $HfO_2$ and $Mo_2C$ in contents of 0.2 to 3% by mass, 0.5 to 5% by mass, 2 to 6% by mass, 0.5 to 3% by mass and 0.1 to 3% by mass, respectively. In the second combination, six elements, Y, Mg, Al, Hf, Mo and C are added as the additive components.

As a third combination, $Y_2O_3$, AlN and $HfO_2$ are added in contents of 2 to 7% by mass, 3 to 7% by mass and 0.5 to 4% by mass, respectively. Herewith, three elements, Y, Al and Hf are added as the additive components.

In the first to third combinations, the upper limit of the total of the contents of the sintering aid components is set to 15% by mass or less.

In any of the first to third combinations, no combination adding both $Y_2O_3$ and $Al_2O_3$ is used. The first combination does not use $Y_2O_3$. The second combination includes $MgO.Al_2O_3$ spinel as added therein. The third combination does not use $Al_2O_3$.

The sintering of the combination of $Y_2O_3$ and $Al_2O_3$ tends to form yttrium-aluminum oxides such as YAG ($Al_5Y_3O_{12}$), YAM ($Al_2Y_4O_9$) and YAL ($AlYO_3$). These yttrium-aluminum oxides are poor in heat resistance. The welding tool member for friction stir welding undergoes a high temperature environment of 800° C. or higher in the temperature of the friction surface. The degradation of the heat resistance degrades the durability of the welding tool member.

The additive components are also excellent in the role of the sintering aid. Accordingly, the proportion of the β-type silicon nitride crystal grains of 2 or more in aspect ratio can be made as high as 60% or more. In order to determine the proportion of the β-type silicon nitride crystal grains having an aspect ratio of 2 or more, an arbitrary cross section of the silicon nitride sintered body is observed with a SEM, and an enlarged photograph (magnification: 3000 or more) of the cross section is taken. The major axes (long diameter) and the minor axes (short diameter) of the silicon nitride crystal grains shown in the photograph are measured, and the aspect ratios are determined. The area proportion (%) (area ratio %) of the silicon nitride crystal grains of 2 or more in aspect ratio per a unit area of 50 μm×50 μm is determined.

In order to shorten the welding time of a member to be welded and to enhance the production efficiency, a friction stir welding apparatus preferably uses the welding tool member (probe) at a rotation speed of 800 rpm or more and with an indentation load of 5 kN or more. The frictional heat produces a high temperature environment of 800° C. or higher in the temperature of the friction surface. Accordingly, the probe is required to have both heat resistance and abrasion resistance. Such a welding tool member made of a silicon nitride sintered body is required to have a certain Vickers hardness and a certain fracture toughness value.

Accordingly, the Vickers hardness of the silicon nitride sintered body is preferably 1400 or more. The fracture toughness value of the silicon nitride sintered body is preferably 6.0 MPa·m$^{1/2}$ or more. Moreover, the Vickers hardness is preferably 1450 or more and the fracture toughness value is preferably 6.5 MPa·m$^{1/2}$ or more. The three-point bending strength of the silicon nitride sintered body is preferably 900 MPa or more and further preferably 1000 MPa or more.

Such a welding tool member as described above, for friction stir welding, made of a silicon nitride sintered body is excellent in heat resistance and in abrasion resistance. Accordingly, the welding tool member for friction stir welding, made of a silicon nitride sintered body exhibits an excellent durability even in a harsh welding environment in which the rotation speed is 800 rpm or more, the indentation load is 5 kN or more and the temperature of the friction surface is 800° C. or higher.

Figure 2:
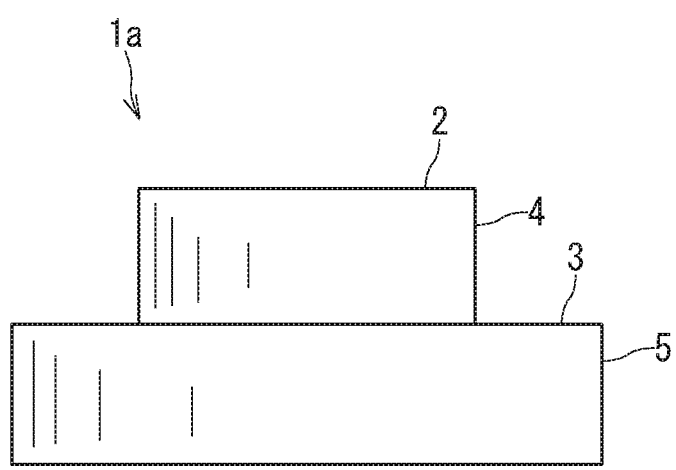
FIG. 2 is a side view illustrating, as an example, a protruding welding tool member for friction stir welding.
Figure 3:
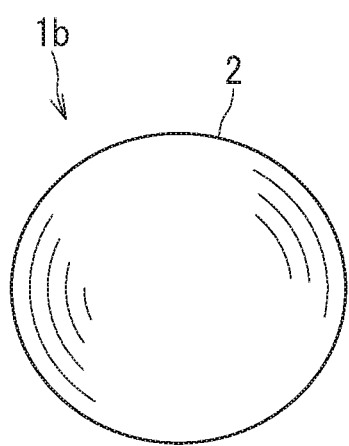
FIG. 3 is a plan view illustrating, as an example, a spherical welding tool member for friction stir welding.

The shape of the welding tool member is not particularly limited; however, typical shapes are shown in FIG. 1, FIG. 2 and FIG. 3. In FIGS. 1 to 3, the reference numeral 1, 1a, 1b denote the welding tool member for friction stir welding, which is made of a silicon nitride sintered body, and the reference numeral 2 denotes the friction surface and the reference numeral 3 denotes the shoulder portion.

FIG. 1 illustrates a cylindrical welding tool member. The flat surface of the cylinder is the friction surface 2. FIG. 2 illustrates a protruding welding tool member 1a. The protruding welding tool member 1a has a shape formed by integrating a cylindrical protruding portion 4 on a cylindrical base portion 5. The flat surface of the protruding portion 4 serves as the friction surface 2.

In the welding tool member 1a according to an embodiment, the base portion 5 and the protruding portion 4 are each constituted with a silicon nitride sintered body. The surface of the base portion 5 serves as the shoulder portion 3. FIG. 3 illustrates a spherical welding tool member 1b. In the spherical welding tool member, the outer circumferential surface of the sphere serves as the friction surface 2.

The friction surface 2 of the welding tool member preferably has surface roughness Ra of 5 μm or less. In the friction stir welding operation, the friction surface is subjected to a high-speed rotation while being pressed against the welding member. Accordingly, the welding tool member is required to have the adhesion (close-contacting property) with the pressing surface of the welding member (base member). When the adhesion is low, the frictional heat is hardly conducted to the mating member (a member to be welded to the base member).

The surface roughness Ra of the welding tool member is preferably 3 μm or less and further preferably 2.5 μm or less. When Ra is excessively large to exceed 5 μm, the adhesion with the pressing surface is degraded, and additionally the abrasion resistance is liable to be degraded due to too large asperities (irregularities).

The lower limit of the surface roughness Ra is not particularly limited, but is preferably 0.01 μm or more. When the surface roughness Ra is as small as less than 0.01 μm, the adhesion between the friction surface 2 and the welding member is improved, but at the same time, the stirring force of the friction surface 2 is degraded.

Here, the stirring force of the friction surface means the force to subject the welding member to plastic deformation (plastic flow). When the stirring force is insufficient, the mutual welding force (bonding strength) between the welding members is degraded. In addition, the plastic deformation of the welding member takes much time, and the welding time is probably elongated. Accordingly, the surface roughness Ra is preferably set to 0.01 to 5 μm and further preferably set to 0.05 to 2.5 μm.

The maximum cross-sectional height Rt of the friction surface 2 is preferably 20 μm or less. When Rt is excessively large to exceed 20 μm, the asperities are too large and the durability of the friction surface 2 is degraded. The welding tool member is a member to be pressed while being subjected to high-speed rotation. The surface roughness Ra is represented in terms of arithmetic average roughness. Even when the friction surface is a flat surface in terms of the average value, if large asperities are present in a micro region, the micro region acts as the fracture origin (starting point of destruction). Accordingly, the maximum cross-sectional height Rt is preferably set to 20 μm or less and further preferably set to 15 μm or less.

The lower limit of Rt is not particularly limited, but is preferably set to 0.04 μm or more. When Rt is less than 0.04 μm, the surface asperities are excessively small, and the stirring force of the friction surface is degraded. Consequently, Rt is preferably set to 0.04 to 20 μm and further preferably set to 0.04 to 15 μm.

The measurements of the surface roughness Ra and the maximum cross-sectional height Rt are performed according to JIS-B-0601. In this case, the measurements are performed with a cut-off length of 0.8 mm.

In the case of the protruding welding tool member 1a as shown in FIG. 2, the surface roughness Ra of the shoulder portion 3 is preferably set to 10 μm or less and the maximum cross-sectional height Rt of the shoulder portion 3 is preferably set to 60 μm or less.

The shoulder portion 3 is the surface on the side of the provision of the friction surface 2 in the base portion 5. In the case of the protruding welding tool member 1a, when the operation of the friction stir welding is performed, the protruding portion 4 with the friction surface 2 provided thereon sinks into the welding member. When the protruding portion 4 sinks deep, the shoulder portion 3 is brought into contact with the welding member. By setting Ra and Rt of the surface of the shoulder portion 3 so as to fall within predetermined ranges, respectively, it is possible to achieve the improvement of the abrasion resistance and the stirring force. In addition, Ra and Rt of the surface of the shoulder portion 3 are preferably measured by allowing the measurement needle (the measurement needle of the surface roughness meter) to operate from the inside toward the outside (or alternatively, from the outside toward the inside).

When the surface roughness is controlled by surface polishing processing, the measurement is preferably performed by moving the measurement needle in the direction perpendicular to the polishing processing direction. The silicon nitride sintered body is a high hardness material, and hence the polishing processing is a polishing using a diamond grindstone or the like. Examples of the polishing processing while the diamond grindstone is being rotated at a high speed include lapping processing and polishing processing. When polishing is performed along the rotation direction of the grindstone, polishing traces are formed on the polishing processed surface along the rotation direction of the grindstone. Consequently, the surface roughness in the direction perpendicular to the polishing direction is larger. By controlling Ra and Rt of the shoulder portion on the basis of the measurement performed by moving the measurement needle in the direction perpendicular to the polishing processing direction, it is possible to further achieve the improvement of the abrasion resistance and the stirring force.

It is also effective to match the rotation direction of the protruding welding tool member 1a and the polishing direction of the shoulder portion 3 with each other.

The size of the welding tool member is optional, but is preferably such that the diameter of the friction surface 2 is 1 mm or more. In the case of the spherical probe as shown in FIG. 3, the diameter is set to be 1 mm or more. The probe according to an embodiment is formed of a silicon nitride sintered body, and hence the diameter of the friction surface is preferably 1 mm or more and 50 mm or less, and further preferably 2 mm or more and 25 mm or less. With such a range of the size of the friction surface, the friction surface is easily polished so as for the surface roughness Ra of the friction surface to be 5 μm or less.

A friction stir welding apparatus using the welding tool member (probe) for friction stir welding, made of a silicon nitride sintered body, according such an embodiment as described above is excellent in the durability of the probe, hence makes it possible to achieve the reliability and the long operating life as a welding apparatus.

In particular, such a friction stir welding apparatus as described above exhibits an excellent durability even in a harsh use environment such that the rotation speed is 800 rpm or more, the indentation load is 5 kN or more and the temperature of the friction surface is 800° C. or higher. In addition, such a friction stir welding apparatus as described above provides a sufficient welding strength even in the case of a short welding time.

Next, the method for producing the welding tool member for friction stir welding, made of a silicon nitride sintered body is described. The welding tool member for friction stir welding, made of a silicon nitride sintered body, according to an embodiment is not particularly limited with respect to the production method thereof, as long as having the above-described constitution. However, as a method for efficiently obtaining the foregoing welding tool member, the following method is quoted.

First, a silicon nitride powder is prepared. The silicon nitride powder is preferably an α-type silicon nitride powder having an average particle size of 2 μm or less. On the basis of the use of such a silicon nitride powder, the α-type silicon nitride powder is converted into the β-type in the sintering step, and hence the obtained sintered body is allowed to have a structure in which the β-type silicon nitride crystal grains are intricately intertwined. The content of the impurity oxygen in the silicon nitride powder is preferably 2% by mass or less.

Next, a sintering aid power as an additive component is prepared. The sintering aid powder is a combination including three or more elements selected from Y, Al, Mg, Si, Ti, Hf, Mo and C. The form of the addition includes one or more selected from an oxide powder (inclusive of composite oxides), a nitride powder (inclusive of composite nitrides), a carbide powder (inclusive of composite carbides) and a carbonitride (inclusive of composite carbonitrides). The total amount of the one or more powders is specified to be 15% by mass or less. The average particle size of the sintering aid powder is preferably 3 μm or less.

The preferable combinations of the sintering aid powders are the above-described first to third combinations.

As the first combination, MgO, $Al_2O_3$, SiC and $SiO_2$ are added in contents of 0.1 to 1.7% by mass, 0.1 to 4.3% by mass, 0.1 to 10% by mass and 0.1 to 2% by mass, respectively. Herewith, four elements of Mg, Al, Si and C are included as the sintering aid components. When MgO and $Al_2O_3$ are added, MgO and $Al_2O_3$ may be added as $MgO.Al_2O_3$ spinel in a content of 0.2 to 6% by mass. To above the first combination, $TiO_2$ may be additionally added in a content of 0.1 to 2% by mass. The addition of $TiO_2$ to the first combination results in the inclusion of five elements, Mg, Al, Si, C and Ti as the sintering aid components.

As the second combination, $Y_2O_3$, $MgO*Al_2O_3$ spinel, AlN, $HfO_2$ and $Mo_2C$ in contents of 0.2 to 3% by mass, 0.5 to 5% by mass, 2 to 6% by mass, 0.5 to 3% by mass and 0.1 to 3% by mass, respectively, are added to each other. In the second combination, six elements, Y, Mg, Al, Hf, Mo and C are added as the sintering aid components.

As the third combination, $Y_2O_3$, AlN and $HfO_2$ are added in contents of 2 to 7% by mass, 3 to 7% by mass and 0.5 to 4% by mass, respectively. By adopting this composition, three elements, Y, Al and Hf are added as the sintering aid components.

Next, the silicon nitride powder and the sintering aid powder were mixed with each other in a ball mill to prepare a starting material powder. Next, an organic binder is added to the starting material powder, and the molding step is performed. The molding step preferably uses a molding die having an intended probe shape. For the molding step, die molding method, CIP (cold isostatic pressing) method or the like may be used.

Next, the molded body obtained in the molding step is degreased. The degreasing step is preferably performed in nitrogen gas atmosphere at a temperature of 400 to 800° C.

Next, the degreased molded body obtained in the degreasing step is sintered. The sintering step is performed at a temperature of 1600° C. or higher. The sintering step is preferably performed in an inert gas atmosphere or in vacuum. Examples of the inert gas atmosphere include a nitrogen gas atmosphere and an argon gas atmosphere. Examples of the sintering step may include a normal pressure sintering method, a pressure sintering method, and HIP (hot isostatic pressing) method. Alternatively, a plurality of the above sintering methods may also be combined.

For the obtained sintered body, if necessary, the place corresponding to the friction surface is subjected to polishing processing. By the polishing processing, the surface roughness Ra of the friction surface is made to be 5 μm or less. The polishing processing is preferably a polishing processing using a diamond grindstone.

As shown in FIG. 2, in the case of the protruding welding tool member 1a, if necessary, the surface polishing processing of the shoulder portion 3 is performed. For the portions other than the friction surface 2 and the shoulder portion 3, if necessary, a polishing processing is applied.

The control of the surface roughness Ra and the maximum cross-sectional height Rt on the basis of the polishing processing can be performed by varying the polishing processing conditions. For example, there may be quoted a method in which the polishing step is performed a plurality of times while the grit of the diamond grindstone is being varied.

EXAMPLES

Examples 1 to 5 and Comparative Examples 1 and 2

As the silicon nitride powder, an α-type silicon nitride powder having an average particle size of 1 μm was prepared. Next, as the sintering aid powders, various compounds shown in Table 1 were prepared.

TABLE 1

| | Additive Components | |
|---|---|---|
| Sample No. | Added Sintering Aid Powders (mass %) | Total Amount of Sintering Aid Powders (mass %) |
| Example 1 | MgO (1.5), $Al_2O_3$ (2.0) $SiO_2$ (0.5), SiC (2), $TiO_2$ (0.5) | 6. 5 |
| Example 2 | $MgO•Al_2O_3$ Spinel (5) $SiO_2$ (1), SiC (4), TiN (2.0) | 12 |
| Example 3 | $MgO•Al_2O_3$ Spinel (6.0) $SiO_2$ (0.5), SiC (5), $TiO_2$ (0.8) | 12.3 |
| Example 4 | $Y_2O_3$ (1) $MgO•Al_2O_3$ Spinel (2) AlN (4), $HfO_2$ (2), $Mo_2C$ (1) | 10 |
| Example 5 | $Y_2O_3$ (4), AlN (4), $HfO_2$ (2), TiCN (1) | 11 |
| Comparative Example 1 | $Y_2O_3$ (5), $Al_2O_3$ (4), AlN (4), $TiO_2$ (1. 5) | 14.5 |
| Comparative Example 2 | $Y_2O_3$ (5), $Al_2O_3$ (2), cBN (15) | 20 |

A starting material powder was prepared by mixing the silicon nitride powder and the sintering aid powder. Next, the starting material powder was mixed with a ball mill, and then an organic binder is mixed in a content of 2% by mass, in the starting material powder. Subsequently, the die molding is performed by using the obtained starting material powder. As the die, a molding die for forming a protruding probe as shown in FIG. 2 was used.

Next, the molded body was subjected to a normal pressure sintering in nitrogen gas atmosphere under the conditions of 1800° C. and 5 hours. Subsequently, the resulting sintered body was subjected to a HIP (hot isostatic pressing) sintering under the conditions of 1700° C. and 2 hours. The shape of the protruding probe is the shape shown in FIG. 2; the diameter and the thickness of the base portion were both 20 mm: and the diameter and the thickness of the protruding portion were 10 mm and 5 mm, respectively.

Next, the place of the obtained sintered body corresponding to the friction surface was subjected to a polishing processing by using a diamond grindstone. The surface roughness Ra after the polishing processing was 2 μm. The maximum cross-sectional height Rt of the friction surface was 8 μm.

In Examples and Comparative Examples, the shoulder portions were also subjected to polishing processing. Consequently, Ra and Rt of each of the shoulder portions were 5 μm and 13 μm, respectively.

Each of the Ra measurement and the Rt measurement was performed according to JIS-B-0601 with a cut-off length of 0.8 mm. With respect to the surface roughness of the shoulder portion, Ra and Rt were measured while the measurement needle was being operated from the inside toward the outside.

By such a method as described above, the welding tool member for friction stir welding, made of a silicon nitride sintered body, according to each of Examples and Comparative Examples was prepared.

Next, for the welding tool member for friction stir welding, made of a silicon nitride sintered body, according to each of Examples and Comparative Examples, the Vickers hardness, the fracture toughness value and the three-point bending strength were measured. The Vickers hardness was measured according to JIS-R1610, and the fracture toughness value was measured according to JIS-R-1607. The fracture toughness value was determined on the basis of the IF method by using the formula of Niihara. The results thus obtained are shown in Table 2.

TABLE 2

| Sample No. | Vickers Hardness | Fracture Toughness (MPa·m$^{1/2}$) |
|---|---|---|
| Example 1 | 1550 | 6.5 |
| Example 2 | 1480 | 6.7 |
| Example 3 | 1520 | 6.9 |
| Example 4 | 1450 | 6.9 |
| Example 5 | 1500 | 6.9 |
| Comparative Example 1 | 1450 | 6.5 |
| Comparative Example 2 | 1700 | 7.0 |

Next, for the welding tool member according to each of Examples and Comparative Examples, a durability test was performed. The durability test was performed by carrying out a friction stir welding of a cold rolled steel plate (thickness: 1.0 mm) and another cold rolled steel plate (thickness: 1.0 mm). In a friction stir welding apparatus, the welding tool member according to each of Examples and Comparative Examples was set, and a 2000-cycle durability test was performed. In the welding step, the operation of the welding by pressing the welding tool member with rotation speed (rpm) shown in Table 3 for a time of 4 seconds was taken as one cycle.

The success or failure as the welding tool member was performed as follows: a tensile shear test of the cold rolled steel plates subjected to friction stir welding at the 2000th cycle of the welding operation was subjected to a tensile shear test, and the case where the class A tensile strength (kN) of JIS-Z-3140 was obtained was classified as success.

By altering the pressing conditions as shown in Table 3, the same durability test was performed. The results thus obtained are shown in Table 4.

TABLE 3

| Test Condition 1 | | Test Condition 2 | |
|---|---|---|---|
| Rotation Speed (rpm) | Welding Time (sec) | Rotation Speed (rpm) | Welding Time (sec) |
| 1000 | 4 | 1600 | 4 |

TABLE 4

| Sample No. | Test Condition 1 | Test Condition 2 |
|---|---|---|
| Example 1 | 6.5 kN Success | 6.0 kN Success |
| Example 2 | 6.5 kN Success | 5.9 kN Success |
| Example 3 | 6.5 kN Success | 5.8 kN Success |
| Example 4 | 6.0 kN Success | 5.9 kN Success |
| Example 5 | 6.0 kN Success | 6.0 kN Success |
| Comparative Example 1 | 5.0 kN Success | 3.5 kN Failure |
| Comparative Example 2 | 4.0 kN Failure | 2.5 kN Failure |

As can be seen from the results shown in Table 4, the welding tool member according to each of Examples was verified to exhibit an excellent durability. As can be seen from a comparison with Comparative Example 1, it was revealed that even when the Vickers hardness and the fracture toughness value are high, the amount of the sintering aid component exceeding 15% by mass to be large degrades the durability as the welding tool member for friction stir welding.

Examples 6 to 10

The welding tool member of Example 3 was subjected to surface polishing processing so as to have the surface roughnesses as shown in Table 5. The surface roughness measurement method is the same as in Example 3.

TABLE 5

| | Friction Surface | | Shoulder Portion | |
|---|---|---|---|---|
| Sample No. | Ra (μm) | Rt (μm) | Ra (μm) | Rt (μm) |
| Example 3 | 2 | 8 | 5 | 13 |
| Example 6 | 0.05 | 1.4 | 0.06 | 2.9 |
| Example 7 | 1 | 3 | 2 | 10 |
| Example 8 | 3 | 7 | 6 | 20 |
| Example 9 | 5 | 13 | 10 | 35 |
| Example 10 | 9 | 25 | 15 | 65 |

The welding tool members according to Examples 6 to 10 were subjected to the durability test under the same conditions as in Example 3. The results thus obtained are shown in Table 6 hereunder.

TABLE 6

| Sample No. | Test Condition 1 | Test Condition 2 |
|---|---|---|
| Example 3 | 6.5 kN Success | 5.8 kN Success |
| Example 6 | 5.9 kN Success | 5.2 kN Success |
| Example 7 | 6.6 kN Success | 6.0 kN Success |
| Example 8 | 6.5 kN Success | 5.9 kN Success |
| Example 9 | 5.7 kN Success | 5.1 kN Success |
| Example 10 | 5.3 kN Success | 3.8 kN Failure |

As can be seen from the results shown in Table 6 presented above, it has been revealed that the welding tool member according to each of Examples 5 to 9 exhibits an excellent durability in which the surface roughness Ra of the friction surface is 5 μm or less, Rt of the friction surface is 20 μm or less, the surface roughness Ra of the shoulder portion is 10 μm or less and Rt of the shoulder portion is 60 μm or less.

Example 10 having a large surface roughness was evaluated as failure with respect to the durability when the test condition became severe. This is because the durability of the tool surface was degraded, and accordingly the stirring force was degraded. It has been revealed that as described above, not only on the basis of the control of the sintering aid amount of the silicon nitride sintered body, but by combining the control of the sintering aid amount with the control of the surface roughness, the performance of the welding tool member is improved.

In the preceding description, several embodiments of the present invention are presented; however, these embodiments are presented as examples, but have no intention to limit the scope of the invention. These novel embodiments can be implemented in various forms, and within a range not deviating from the gist of the invention, various omissions, replacements and alterations can be performed. These embodiments and the modified examples thereof are included in the scope or the gist of the invention, and at the same time, included in the invention described in the scope of the claims and the equivalent scope thereof. The foregoing embodiments can be implemented as mutually combined.

REFERENCE SIGNS LIST 1, 1a, 1b . . . welding tool member for friction stir welding
2 . . . friction surface
3 . . . shoulder portion
4 . . . protruding portion
5 . . . base portion

The invention claimed is:

1. A welding tool member for friction stir welding comprising a silicon nitride sintered body, wherein the silicon nitride sintered body includes an additive component other than silicon nitride in a content of 3% by mass or more and 12.5% by mass or less, and the additive component includes three or more elements selected from Y, Al, Mg, Si, Ti, Hf, Mo and C, wherein a surface roughness Ra of a friction surface of the silicon nitride sintered body is 0.05 μm or more and 5 μm or less, and a maximum cross sectional height Rt of the friction surface is 0.04 μm or more and 20 μm or less, and a Vickers hardness of the silicon nitride sintered body is 1400 or more, wherein the welding tool member comprises a base portion and a protruding portion, in which a surface of the base portion serves as a shoulder portion, a surface roughness Ra of the shoulder portion being 0.06 μm or more and 10 μm or less, and a maximum cross-sectional height Rt of the shoulder portion being 2.9 μm or more and 35 μm or less, wherein the surface roughness Ra and the maximum cross-sectional height Rt of the shoulder portion are measured by operating a measurement needle along the shoulder portion, and wherein both the friction surface and the shoulder portion are subjected to polishing processing, the surface roughness Ra of the friction surface is an average value, the surface roughness Ra of the shoulder portion is an average value, the maximum cross-sectional height Rt of the friction surface is an absolute value, and the maximum cross-sectional height Rt of the shoulder portion is an absolute value.

2. The welding tool member for friction stir welding, made of a silicon nitride sintered body, according to claim 1, wherein the additive component includes four or more elements selected from Y, Al, Mg, Si, Ti, Hf, Mo and C.

3. The welding tool member for friction stir welding, made of a silicon nitride sintered body, according to claim 1, wherein a fracture toughness value of the silicon nitride sintered body is 6.5 MPa·m$^{1/2}$ or more.

4. A friction stir welding apparatus using the welding tool member for friction stir welding, made of a silicon nitride sintered body, according to claim 1.

5. The welding tool member for friction stir welding, made of a silicon nitride sintered body, according to claim 1, wherein the welding tool member is used in a high temperature environment of 800° C. or higher produced by friction heat at the friction surface.

6. The welding tool member for friction stir welding, made of a silicon nitride sintered body, according to claim 1, wherein the friction stir welding tool member is used with an indentation load of 5 kN or more.

7. The welding tool member for friction stir welding, made of a silicon nitride sintered body, according to claim 1, wherein the friction stir welding tool member is rotatable at a rotation speed of 800 rpm or more.

8. The welding tool member for friction stir welding, made of a silicon nitride sintered body, according to claim 1, wherein the welding tool member is used under an environment such that a welding temperature of the friction surface is 800° C. or more.

9. The friction stir welding apparatus according to claim 4, wherein a welding temperature of the friction surface is 800° C. or more.

10. The friction stir welding apparatus according to claim 4, wherein a member to be welded is a cold rolled steel plate.

* * * * *